Sept. 12, 1950     E. STRASSENBURG     2,522,143
DEVICE FOR CUTTING ONIONS OR OTHER VEGETABLES
Filed Nov. 6, 1947     3 Sheets-Sheet 1
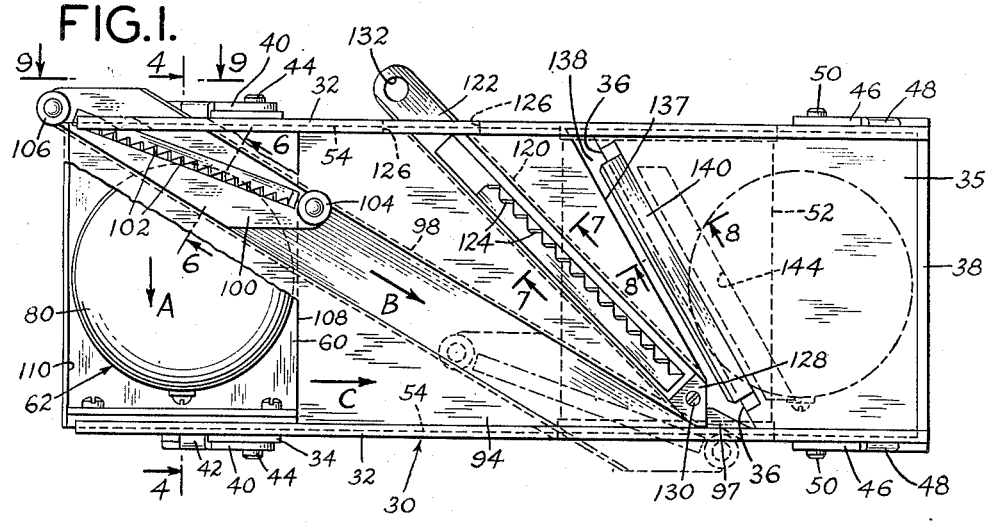
INVENTOR.
ERIC STRASSENBURG
BY
ATTORNEY.

Sept. 12, 1950   E. STRASSENBURG   2,522,143
DEVICE FOR CUTTING ONIONS OR OTHER VEGETABLES
Filed Nov. 6, 1947   3 Sheets-Sheet 2
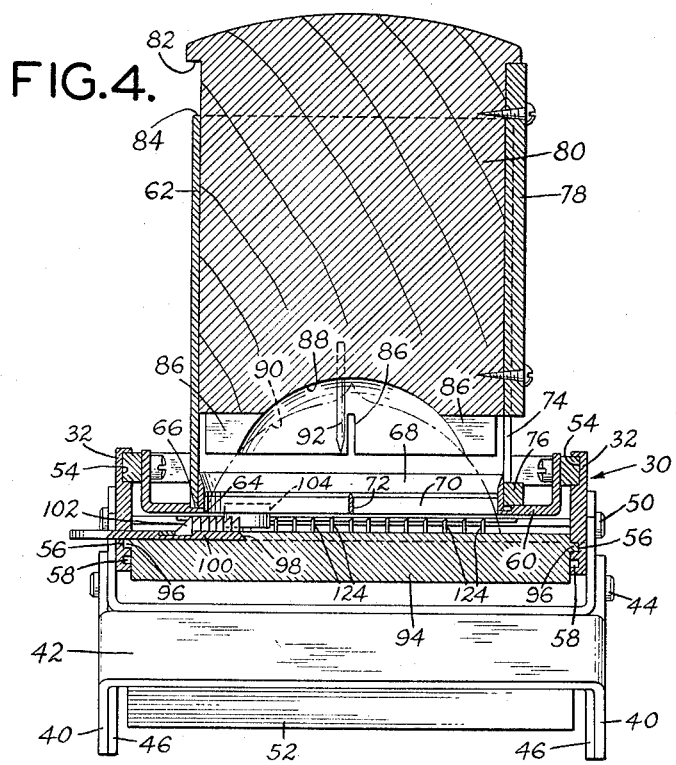
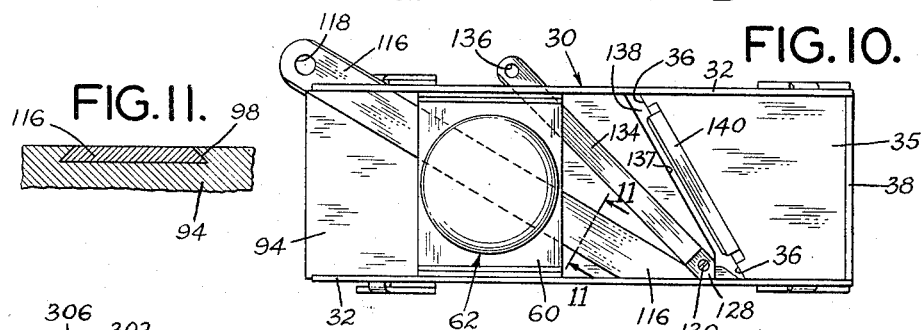
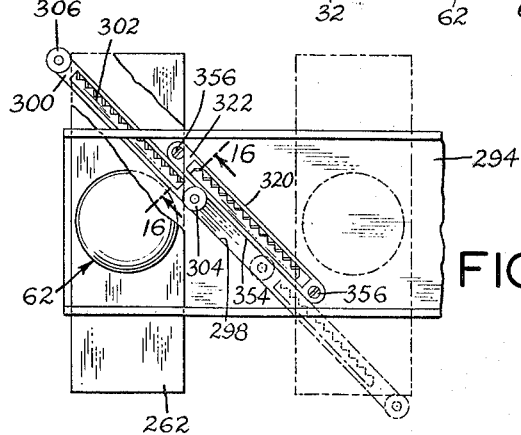
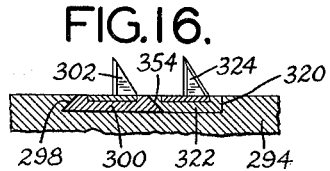
INVENTOR.
ERIC STRASSENBURG
BY
ATTORNEY.

Sept. 12, 1950     E. STRASSENBURG     2,522,143
DEVICE FOR CUTTING ONIONS OR OTHER VEGETABLES
Filed Nov. 6, 1947     3 Sheets-Sheet 3
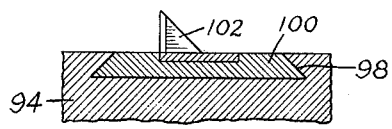
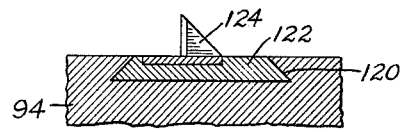
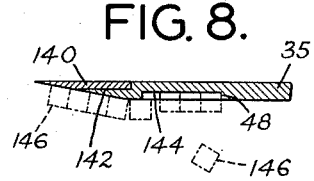
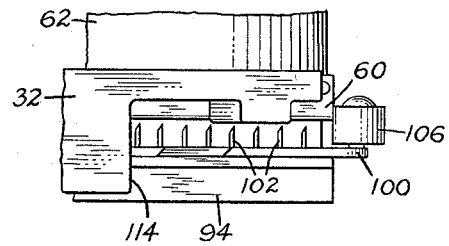
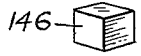
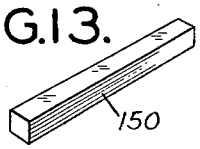
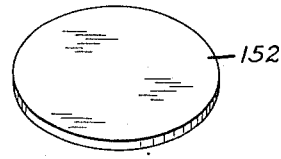
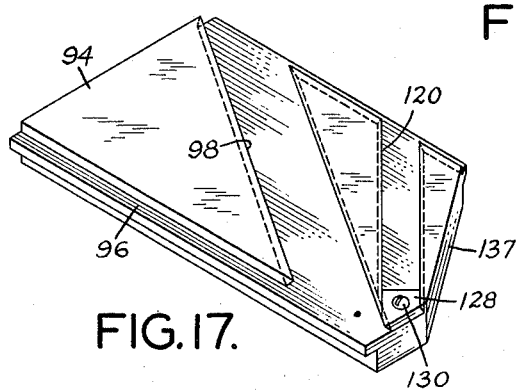
INVENTOR.
ERIC STRASSENBURG
BY
ATTORNEY.

Patented Sept. 12, 1950

2,522,143

UNITED STATES PATENT OFFICE 2,522,143

DEVICE FOR CUTTING ONIONS OR OTHER VEGETABLES

Eric Strassenburg, Bronx, N. Y.

Application November 6, 1947, Serial No. 784,315

18 Claims. (Cl. 146—78)

The present invention relates to kitchen utensils, and more particularly to a device for cutting onions or other vegetables.

An object of the present invention is to provide a device, by means of which onions may be readily cut into small pieces without bothering effects on the person handling the onions.

A further object of the present invention is to provide a device, by means of which onions or other vegetables may be cut into pieces in the shape of cubes.

Another object of the present invention is to provide a device for cutting onions or other vegetables, which may be readily adjusted in such a manner that the pieces cut by the device are either in the shape of cubes, parallelepipedons or slices.

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

Fig. 1 is a top plan view of a cutting device according to the invention,

Fig. 2 is a front elevational view of the device shown in Fig. 1,

Fig. 3 is a fragmentary side elevational view of the device shown in Fig. 1,

Fig. 4 is a sectional view taken on line 4—4 of Fig. 1,

Fig. 5 is a perspective illustration of a detail of the device,

Fig. 6 is a sectional view taken on line 6—6 of Fig. 1,

Fig. 7 is a sectional view taken on line 7—7 of Fig. 1,

Fig. 8 is a sectional view taken on line 8—8 of Fig. 1,

Fig. 9 is a fragmentary rear elevational view along line 9—9 of Fig. 1,

Fig. 10 is a somewhat diagrammatical top plan view of the device shown in Fig. 1, wherein, however, the container holding the vegetable is in a different position and wherein the cutting means are replaced by blanks, Fig. 11 is a sectional view taken on line 11—11 of Fig. 10, Figs. 12–14 are perspective illustrations of different shapes of pieces which may be cut by the device shown in Fig. 1, Fig. 15 is a diagrammatical top plan view of a different embodiment of a device for cutting vegetables according to the invention, Fig. 16 is a sectional view taken on line 16—16 of Fig. 15, and Fig. 17 is a perspective view of a detail of the device shown in Fig. 1.

Referring now to Figs. 1–4 and 10, 30 generally indicates a frame comprising front and rear rails 32 rigidly connected with each other. At the left hand side, said rails 32 are connected with each other by a U-shaped transverse bracing member 34; at the right hand side, said rails 32 are connected with each other by a plate 35. Said plate 35 has an inclined edge 36 at its left hand end (see Figs. 1 and 10). A wall 38 extends between the rails 32 at the right hand end of the device.

A pair of legs 40 rigidly connected with each other by a bracing member 42 is swingably mounted on the U-shaped bracing member 34 of the frame 30 at 44; a pair of legs 46 rigidly connected with each other by a bracing member 48 is swingably mounted on the guide rails 32 of the frame 30 at 50. Each of said pair of legs 40 and 46 respectively may be collapsed by swinging same about its pivot 44 and 50 respectively. When the pair of legs 40 and 46 are set up as shown in Figs. 1–4, the bracing member 42 abuts against the U-shaped bracing member 34 acting as a stop and the bracing member 48 abuts against the lower edges of the rails 32, likewise acting as a stop.

A drawer 52 is slidably mounted on transverse bars 53 secured to the lower edges of the rails 32.

As best shown in Figs. 3 and 4, each of the rails 32 has a guiding slot 54 and two grooves 56 and 58.

A supporting base 60 carrying a container 62 for receiving an onion or potato or other vegetable is slidably engaged with the grooves 54 of said rails or guide rails 32 so that it may be reciprocated in the direction of the longitudinal axis of the device from the position shown in full lines in Figs. 1 and 2 into the position shown in dash lines in said figures and back. The right hand end position shown in dash lines is limited by an abutment of the supporting base 60 against the wall 38 acting as a stop. As best shown in Fig. 4, the supporting base 60 has a center bore 64. The cylinder 62 constituting the container for receiving the vegetable is open at its lower and upper ends. The lower end of said cylinder 62 rests on a recess 66 of the base 60, so that the opening of the container 62 is in register with the bore 64 of the base 60. A ring 68 (see Figs.

4 and 5) carrying a cross of knives 70, 72 is snugly but removably inserted into the cylindrical container 62 at the lower end thereof. Said ring 68 likewise resting on the recess 66 of the base 60 is held in its position by a member 76 secured to said ring and slidably engaged with a longitudinal guiding slot 74 of the cylindrical container 62.

The guiding slot 74 of the container 62 is also in engagement with a bar 78 secured to a cylindrical pusher 80 slidably arranged in the container 62. The lowermost position of the pusher 80 guided by said cooperating bar 78 and slot 74 is limited by an abutment of a flange 82 arranged at its upper portion against the upper edge 84 of the container 62. The lower end portion of said pusher 80 is provided with a series of slots 86 capable of receiving the knives 70, 72 of the cross of knives arranged in the ring 68, when the pusher 80 is in its lowermost position. Furthermore, said lower portion of the pusher 80 is reduced in diameter so as to fit into said ring 68. Moreover, the pusher 80 is provided with a spherical recess 88 at its lower portion for receiving a portion of the vegetable, for example, an onion 90 to be cut. A pointed pin 92 secured to the lower portion of the pusher 80 projects into the space of the spherical recess 88. Said pin 92 serves to pierce the portion of the onion or the like embraced by the walls of the spherical recess 88 for a better holding of the onion.

A plate or board 94 of the shape best shown in Figs. 1, 10 and 17 having a tongue 96 on each of its sides may be adjustably carried by the frame 30 in the following manner: said tongues 96 may be slidably engaged either with the grooves 56 or with the grooves 58 of the guide rails 32. If the tongues 96 are inserted into the grooves 56 as shown in Figs. 3 and 4, the upper surface of the board 94 will be at a certain distance from the lower end of the container 62. If, for reasons to be explained hereinafter, said distance between the upper surface of the board 94 and the lower end of the container 62 shall be increased, the board 94 with its tongues 96 is removed from the grooves 56, whereupon it is engaged with the frame 30 in such a manner that now its tongues 96 are placed into the lower grooves 58. The position of the plate or board 94 in the frame 30 is limited by an abutment of said board 94 against a stopping member 97 secured to the frame 30 (see Figs. 1 and 2).

As best shown in Figs. 1, 3, 4, 6, and 17 the board 94 is provided at its upper surface with a dove-tailed channel 98 constituting a transverse track extending from one side of the board to the other side thereof at an angle to the longitudinal axis of the board. A slide 100 carrying a series of cutting blades 102 may be slidably engaged with said track or channel 98. When said slide 100 is thus engaged with the track 98, its cutting blades 102 project from the surface of the board 94 into a plane slightly below the lower surface of the supporting base 60 of the container 62 as best shown in Figs. 3 and 4. Engaging rollers 104 and 106 rotatably arranged on the slide 100 may be brought into operative engagement with the edges 108 and 110 respectively of the supporting base 60 of the container 62 as best shown in Figs. 1 and 2. Thus, when the container 62 resting on the supporting base 60 is shifted from the extreme left-hand position of the device as shown in Fig. 1 to the extreme right-hand position shown in dash lines in said Fig. 1, the slide 100 carrying the cutting blades 102 is moved along the track 98 below the container 62 from the position shown in full lines in Fig. 1 into the position shown in dash lines in said Fig. 1. Apparently, said displacement of the slide 100 occurs in dependence on the movement of the container 62 by the cooperation between the edge 108 and the roller 104. Of course, the front guide rail 32 is provided with an opening 112 (see Fig. 2) so that the slide 100 may project from said guide rail 32 in its dash line position shown in Fig. 1.

When the container 62 is returned from its right hand end position shown in dash lines in Fig. 1 into its left hand end position shown in full lines in Fig. 1, the slide 100 will be returned from its dash line position into its full line position by the cooperation between the edge 110 of the base 60 and the roller 106 as soon as said elements come into engagement with each other. As best shown in Fig. 9 the rear guide rail 32 is provided with a recess 114 permitting the slide 100 to project from the rear guide rail 32 when it is in the full line position shown in Fig. 1.

As best shown in Fig. 1, the cutting blades are arranged in such a manner on the slide 100 that they may perform transverse cuts in the direction of the arrow A into an onion or the like placed into the container 62, when the slide 100 is displaced by the supporting base 60 of the container 62 in the channel 98 in the direction of the arrow B during a movement of the container 62 in the direction of the arrow C.

The slide 100 with its cutting blades 102 is exchangeable. If it is desired to replace the slide 100 by another one carrying higher cutting blades so as to obtain deeper cuts into the onion or other vegetable, the following performances are carried out: the supporting base 60 with the container 62 is disengaged entirely from the guide rails 32 by shifting same to the left from the full line position shown in Fig. 1. Thereupon, the slide 100 may be removed from the channel 98 through the recess 114 in the rear guide rail 32. Now the board 94 is removed from the frame 30 by moving the board 94 to the left, as viewed in Fig. 1 and thus disengaging the tongues 96 from the grooves 56 of the guide rails 32. Thereafter, the board 94 is re-inserted into the frame 30, this time, however, in such a manner that the tongues 96 are engaged with the groove 58. Now, a slide having higher cutting blades, which may also be spaced at larger distances from each other than the cutting blades of the slide 100 shown in the drawings is inserted into the channel 98 of the board 94 approximately into the position of the slide shown in full lines in Fig. 1. Thereafter, the supporting base 60 with the container 62 may be re-engaged with the guide rails 32, so that the device is ready for operation.

Furthermore, for a purpose to be described hereinafter, the slide 100 with its cutting blades 102 may also be replaced by a blank 116 (see Figs. 10 and 11) inserted into the channel 98. Said blank 116 lacking any cutting blades is flush with the surface of the board 94 and has a hole 118 for easy manipulation during the insertion and removal of the blank.

In addition to above described transverse track 98, the board 94 is also provided with a groove 120 as best shown in Figs. 1, 7 and 17. In the embodiment shown in Fig. 1 the longitudinal axis of said groove 120 extends at an angle to the longitudinal axis of the track 98 and at an angle to the longitudinal axis of the board 94. A bar 122 carrying a series of cutting blades 124 may be inserted through an aperture 126 of the rear guide rail 32 into said groove 120 until it hits against an abutment 128 secured to the board 94 by a screw 130. The bar 122 is provided with a hole 132 for easy manipulation. When the bar 122 with the cutting blades 124 is inserted into the board 94, the cutting blades 124 constitute a series of stationary cutting means. As best shown in Fig. 4, the cutting blades 124 project from the upper surface of the board 94 substantially to the same level as the cutting blades 102 of the slide 100 slightly below the lower surface of the base 60. Moreover, the cutting edges of said cutting blades 124 are arranged at an angle to the cutting edges of the cutting blades 102 of the slide 100, preferably at a right angle thereto. In the embodiment shown in the drawings, the cutting edges of said cutting blades 124 are arranged in the direction of the longitudinal axis of the device, i. e., in the direction of movement of the container 62 so that they may perform longitudinal cuts into the onion or the like placed into the container 62 when the container 62 being moved along the board 94 in the direction of the arrow C passes over said stationary cutting blades 124.

The bar 122 with its cutting blades 124 is exchangeable and may be replaced, for example, by a bar with cutting blades of greater height, if so desired. It is understood that the cutting blades of the bar 122 should be of the same height as the cutting blades 102 of the slide 100 and that, consequently, the bar 122 with the cutting blades 124 must be replaced by a bar with higher cutting blades, if the slide 100 with the cutting blades 102 is replaced by a slide having higher cutting blades in the manner described above.

Moreover, for a purpose to be described hereinafter, the bar 122 with the cutting blades 124 may be replaced by a blank 134 as shown in Fig. 10. Said blank 134 having no cutting blades at all is flush with the upper surface of the board 94. Furthermore, preferably, said blank 134 is provided with a hole 136 so as to facilitate its manipulation.

As best shown in Figs. 1 and 10, the right hand edge 137 of the board 94 is at a certain distance from the left hand edge 36 of the plate 35 when the board 94 is in its place in the frame 30, whereby a slot 138 is formed above the drawer 52. A shearing blade 140 (see Figs. 1-3 and 8) mounted on a recess 142 of the plate 35 projects somewhat over the slot 138. As best shown in Fig. 3, the cutting edge of the shearing blade 140 is substantially in the same plane as the uppermost portion of the stationary cutting blades 124 and of the movable cutting blades 102. Furthermore, as best shown in Fig. 1, the cutting edge of the shearing blade 140 extends at an angle to the longitudinal axes of the track 98 of the groove 120 and of the longitudinal axis of the board of the cutting device comprising the board 94 and the plate 35.

Moreover, as best shown in Figs. 1 and 8, the plate 35 is provided with a groove 144 at its lower side near the shearing blade 140, which serves to disengage pieces cut by the device from the plate 35 if they intend to stick to the latter owing to their being wet.

The operation of the device is as follows:

Assume the device is equipped with a slide 100 carrying the cutting blades 102 and with a bar 122 carrying the cutting blades 124, the former being inserted into the channel 98 and the latter being inserted into the groove 120.

The container 62 with its base 60 is brought into the position shown in full lines in Figs. 1 and 2. The pusher 80 is removed from the container 62 and an onion 90 or other vegetable is placed into the container on top of the cross of knives 70, 72. Thereupon, the pusher 80 is inserted into the container 62 and pressed against the onion or the like whereby the latter is pierced by the pin 92 and, furthermore, is urged against the upper surface of the board 94, the cross of knives 70, 72 cutting into the lower portion of the onion.

Now the container 62 with the supporting base 60 is manually displaced in the direction of the arrow C until it reaches the right hand end position as viewed in Fig. 1 and shown in dash lines in said Fig. 1. During said displacement of the container 62 in the direction of the arrow C, the slide 100 with the cutting blades 102 is displaced in the direction of the arrow B and, owing to said displacement, the movable cutting blades 102 carried by said slide 100 make transverse cuts into the lowermost portion of the onion or the like in the direction of the arrow A. As soon as any part of the onion or the like is brought into engagement with the stationary blades 124 by said movement of the container 62 in the direction of the arrow C, additional longitudinal cuts are made by said stationary blades 124 into the lowermost portion of the onion. Now, when the container 62 with the onion placed therein passes over the shearing blade 140, the lowermost portion of the onion is sheared off from the remaining portion thereof, and, as the onion was previously cut by the cutting blades 102 in the direction of the arrow A and by the cutting blades 104 in the direction of the arrow C, cubes 146 of the shape shown in Fig. 12 are obtained. The cubes 146 drop into the drawer 52 through the slot 138 and if they should intend to stick to the lower side of the plate 35, the edge 148 of the groove 144 will cause a disengagement of such cubes from the plate 35.

Now, the container 62 is returned from its right hand end position into its left hand end position shown in Fig. 1. During said return movement, the cutting blades 124 do not cause cuts in the onion or the like, as the lowermost portion thereof has been cut away by the shearing blade 140 and, consequently, the cutting blades 124 do not reach the onion during said return movement. For the same reason the cutting blades 102 do not cut into the onion when the slide 100 is returned into its starting position during the return movement of the container 62.

After the container 62 has been returned into the position shown in full lines in Figs. 1 and 2, a pressure is exerted on the pusher 80 whereby the onion 90 or the like is again urged against the board 94. Now the same cycle as described above may be repeated as often as is necessary to cut up the onion or the like.

If it is desired to cut the onion or the like into cubes of larger size than, for example, the cubes 146, Fig. 12, the board 94 is adjusted at a larger distance from the container 62 in the manner described above by engaging the tongues 96 with the grooves 58 and the cutting means 102 and 124 are replaced by larger cutting means as described above.

If it is desired to cut the onion, potato or the like into pieces 150 (see Fig. 13) of the shape of a parallelepipedon, preferably the ring 68 with the cross of knives 70, 72 is removed by pushing it upwardly after the pusher 80 has been removed from the container 62. Moreover, the bar 122 with the cutting blades 124 is replaced by a blank 134. The slide 100 with the cutting blades 102, however, remains in the device. Apparently, when an onion, potato, or the like has been placed into the container 62 and urged by the pusher 80 against the board 94 and when further the container 62 is reciprocated along the board 94, 35, only transverse cuts are made into the lowermost portion of the onion, potato or the like, by means of the cutting blades 102, and the portion of the onion, potato or the like thus cut is sheared off by the shearing blade 140. This method of cutting an onion, potato or the like necessarily results into pieces 150 of the shape shown in Fig. 13.

The same result could also be obtained by replacing the slide 100 with the cutting blades 102 by a blank 116 and leaving the stationary cutting blades 124 in the device.

If it is desired to cut the onion, potato or the like, into slices 152 of the shape shown in Fig. 14, the ring 68 with the cross of knives 70, 72 is removed and the slide 100 with the cutting blades 102 as well as the bar 122 with the cutting blades 124 are replaced by blanks 116 and 134 in the manner shown in Fig. 10. In such a case, the shearing blade 140 causes the cutting off of the slices 152, no other cutting action being exerted on the onion, potato, or other vegetable by the device according to the invention.

According to the embodiment shown in Fig. 1, the track 98 guiding the slide 100 with the cutting blades 102 and the groove 120 holding the bar 122 with the cutting blades 124 are arranged at an angle to each other. If it is desired, however, said track 98 and groove 120 may be arranged parallel to each other.

Furthermore, as shown in Figs. 15 and 16, the track 298 of the board 294 guiding the slide 300 with the cutting blades 302 may be arranged parallel and adjacent to the groove 320 of the board 294 holding the bar 322 carrying the cutting blades 324. In this case, a portion of a wall of the track or channel 298 is formed by a side surface 354 of the bar 322 secured to the board 294 by screws 356. Furthermore, owing to the different angle between the track 298 and the longitudinal axis of the device, if compared with the embodiment shown in Fig. 1, the base 260 carrying the container 262 projects on both sides of the device so as to remain in engagement with the engaging rollers 304 and 306 of the slide 300.

Of course, the device for cutting onions or other vegetable according to the invention may be provided with a set of several slides 100 with cutting blades 102 of different size and shape and with a corresponding set of several bars 122 with cutting blades 124 of different size and shape so as to obtain a great variety of shapes of cut pieces. Furthermore, of course, means may be provided for adjusting the board 94 in more than two positions, and such means may also be of different construction than that shown in the drawings. Moreover, means other than that shown in the drawings may be arranged on the cutting device for causing a movement of the transverse cutting means in dependence on a movement of the container holding the vegetable to be cut.

As the onion to be cut is placed into the container 62 and does not need to be handled by a person during the cutting process, there will be no bothering effects on the person when onions are cut in the device according to the invention.

I have described preferred embodiments of my invention but it is understood that many omissions and changes may be made without departing from the scope and spirit of the invention set forth in the appended claims.

For example, a change in the distance between the board carried by the frame and the lower end of the container holding the onion or other vegetable could also be obtained by providing an additional groove or grooves in the guide rails for receiving the supporting base carrying the container; in such a case, the board would be rigidly connected with the frame and the supporting base of the container would be engaged with the groove selected for the desired distance between the board and the lower end of the container.

Furthermore, the supporting base of the container could be provided with rollers engaged with the grooves of the guide rails.

Moreover, the ring carrying the cross of knives could be provided with a handle secured to the member engaged with the guiding slot of the container, so as to facilitate the removal and inserting of said ring.

What I claim is:

1. A device for cutting onions or other vegetables, comprising: a frame, a board carried by said frame, a container capable of receiving an onion or other vegetable, said container being open at its bottom and being slidably mounted on said frame for reciprocating movements along the surface of said board, a leading and a trailing edge on said container, pushing means associated with said container for urging an onion through the open bottom thereof against the surface of said board, a transverse track arranged on said board, said track extending at an acute angle to the direction of movement of said container, movable cutting means engaged with said track, at least one of said leading and trailing edges of the container being arranged for engagement with said movable cutting means whereby the latter is displaceable along said track and transversely of said container in dependence on a movement of said container along said board, said cutting means comprising a series of cutting blades projecting upwardly from the surface of said board and being arranged for making parallel transverse cuts with respect to the movements of the container into the lower portion of the onion during such a movement of the cutting means along said track, and stationary shearing means arranged on said board below the path of said container for shearing off the portion of the onion provided with cuts by said cutting means.

2. In a device as claimed in claim 1, said movable cutting means being exchangeably arranged in said track.

3. In a device as claimed in claim 1, said edge of the container arranged for engagement with said movable cutting means being shiftably engaged with the latter.

4. In a device as claimed in claim 1, said board having a channel constituting said track, and a slide carrying the series of cutting blades being slidably engaged with said channel.

5. In combination with a device as claimed in claim 1, said board having a channel constituting said track, a slide carrying the series of cutting blades being slidably engaged with said channel, said slide being removable, and a blank for insertion into said channel so as to close same when the slide is removed.

6. A device for cutting onions or other vegetables, comprising: a frame, a board carried by said frame, a container capable of receiving an onion or other vegetable, said container being open at its bottom and being slidably mounted on said frame for reciprocating movements along the surface of said board, a leading and a trailing edge on said container, pushing means associated with said container for urging an onion through the open bottom thereof against the surface of said board, a transverse track arranged on said board, said track extending at an acute angle to the direction of movement of said container, first movable cutting means engaged with said track, at least one of said leading and trailing edges of the container being arranged for engagement with said first movable cutting means whereby the latter is displaced along said track and transversely of said container in dependence on a movement of said container along said board, said first movable cutting means comprising a first series of cutting blades projecting upwardly from the surface of said board and being arranged for making parallel transverse cuts with respect to the movements of the container into the lower portion of the onion during such a movement of the first cutting means along said track, second stationary cutting means arranged on said board below the path of said container, said second stationary cutting means comprising a second series of cutting blades projecting upwardly from the surface of said board and being arranged for making parallel longitudinal cuts in the direction of the movements of the container into said lower portion of the onion when said container passes over said second stationary cutting means, and stationary shearing means arranged on said board below the path of said container for shearing off the portion of the onion provided with cuts by said first and second cutting means.

7. In a device as claimed in claim 6, said first and said second cutting means being exchangeably arranged on said board.

8. In a device as claimed in claim 6, said edge of the container arranged for engagement with said first movable cutting means being shiftably engaged with the latter.

9. In a device as claimed in claim 6, said track guiding the first cutting means being arranged at an acute angle to said second cutting means.

10. In a device as claimed in claim 6, said track guiding the first cutting means being parallel to said second cutting means.

11. In a device as claimed in claim 6, said track guiding the first cutting means being arranged parallel and adjacent to said second cutting means.

12. In a device as claimed in claim 6, said board having a channel constituting said track, and a slide carrying the first series of cutting blades being slidably engaged with said channel.

13. In combination with a device as claimed in claim 6, said board having a channel constituting said track, a slide carrying the first series of cutting blades being slidably engaged with said channel, said slide being removable, and a blank for insertion into said channel so as to close same when the slide is removed.

14. In a device as claimed in claim 6, said second cutting means being detachably arranged on said board.

15. In a device as claimed in claim 6, said board having a groove, and said second cutting means being removably inserted into said groove.

16. In combination with a device as claimed in claim 6, said board having a groove, said second cutting means being removably inserted into said groove, and a blank for insertion into said groove so as to close same when the second cutting means is removed.

17. In combination with a device as claimed in claim 6, said board having a channel constituting said track, a slide carrying the first series of cutting blades being slidably engaged with said channel, said slide being removable, a blank for insertion into said channel so as to close same when the slide is removed, and said second cutting means being detachably mounted on said board.

18. In combination with a device as claimed in claim 6, said board having a channel constituting said track, a slide carrying the first series of cutting blades being slidably engaged with said channel, said slide being removable, a first blank for insertion into said channel so as to close same when the slide is removed, said board having a groove, said second cutting means being removably inserted into said groove, and a second blank for insertion into said groove so as to close same when the second cutting means is removed.

ERIC STRASSENBURG.

REFERENCES CITED

The following references are of record in the file of this patent:

UNITED STATES PATENTS

| Number | Name | Date |
|---|---|---|
| 8,310 | Carver | Aug. 26, 1851 |
| 105,958 | Lusher | Aug. 2, 1870 |
| 150,635 | Trump | May 5, 1874 |
| 239,118 | Streicher et al. | Mar. 22, 1887 |
| 2,261,095 | Mesterton | Oct. 28, 1941 |
| 2,286,177 | Fabian | June 9, 1942 |
| 2,374,851 | Curtice | May 1, 1945 |

FOREIGN PATENTS

| Number | Country | Date |
|---|---|---|
| 287,494 | Germany | Sept. 24, 1915 |
| 462,435 | Germany | July 11, 1928 |